Figure 1:
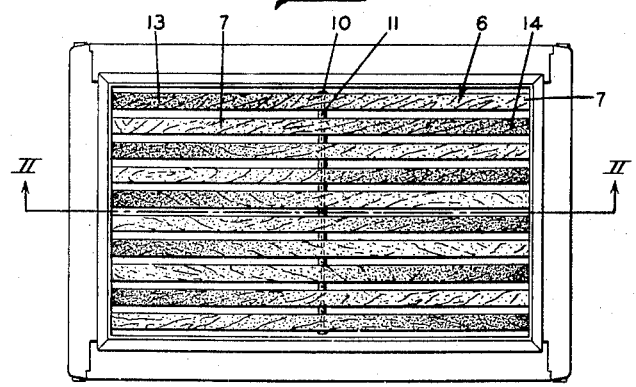

Oct. 28, 1958

L. H. LOCKWOOD 2,857,936

METHOD OF LIMITING PARTICLE SEGREGATION

Filed March 30, 1954

INVENTOR
LOUIS H. LOCKWOOD

ATTORNEY

United States Patent Office 2,857,936
Patented Oct. 28, 1958

2,857,936

METHOD OF LIMITING PARTICLE SEGREGATION

Louis H. Lockwood, Rohrerstown, Pa., assignor to Armstrong Cork Company, Lancaster, Pa., a corporation of Pennsylvania Application March 30, 1954, Serial No. 419,779

4 Claims. (Cl. 141—12)

This invention relates to a method of limiting particle segregation and is concerned more particularly with a method of charging a receptacle with granular material made up of particles of various sizes and thus subject to particle segregation, to deposit the granular material in the receptacle in a condition essentially free of segregation.

The invention finds particular usefulness in the manufacture of products from granulated cork such as cork floor or wall tile composition which is produced by charging binder-coated cork granules into a mold, compressing the granules within the mold, and adhesively joining the particles together into a consolidated mass.

The invention will be described with particular reference to the manufacture compressed cork articles, but it will be understood that the invention is not limited thereto, since the same is of general application and may be employed with other particulate materials.

In the manufacture of cork tile which will be used to illustrate the principles of the present invention, the raw cork bark is ground into pieces, and these pieces are screened or otherwise separated to remove undesirably large particles and also excessively small particles. In the manufacture of cork floor tile, the cork granules may fall within the range of those which pass through a 2-mesh per inch screen (½" mesh) and those which will be retained on a 10-mesh per inch screen. In certain products, as in cork wall tile as disclosed in the patent to Ostermayer, No. 2,671,733, for example, the cork granules may be graded into components of various sizes, with certain intermediate sizes being essentially completely excluded. The cork granules are thinly coated with a binder such as a water dispersion of phenol-formaldehyde resin, and the binder-coated granules are generally delivered into a forming mold through a filling boot which is disposed thereabove. The boot is needed because the granules are light in weight and of considerable bulk and in their uncompressed condition could not be received within the mold unless its walls were extended to an unreasonable depth. The granules are compressed to a smaller volume by a plunger which passes through the filling boot and into the mold, and the mass in this compressed condition is then heated to cure the resinous binder.

It has been found that the cork particles tend to segregate during charging in the mold, the particles building up in the mold and in the filling boot as a conical pile, and the large particles tending to go to the outside of the pile to a position along the side walls of the mold and the filling boot. Such particle segregation is objectionable regardless of whether the cured mass is cut into tiles along the length of the formed block or at an angle thereto, for the areas of the formed mass which were adjacent to the mold walls at charging of the mold are richer in the coarser or larger sized granules than is the area in the center of the mass away from the mold walls. In addition, in order to secure a strong, well-knit product, it is desirable to have the granules essentially uniformly intermixed to avoid the presence of objectionable voids between adjacent particles which will occur if there is excessive segregation. Weak edges and corners of the formed block result from the disposition of the initial cork charge with the large size granules predominantly at the outer wall surfaces.

Another problem arises where the mass disposed in the mold is dielectrically heated to cure the resinous binder, for a higher temperature will be attained in that portion of the mass which is rich in small particles, and consequently of greater density than the outer areas where the larger particles are disposed. This results in possible overcuring of the interior of the block and insufficient curing of the outer portions.

The principal object of the invention is to provide a method of charging a receptacle with granular material made up of particles of various sizes and thus object to particle segregation to deposit the granular material in the receptacle in a condition essentially free of segregation.

According to the method of this invention, the foregoing object is attained by delivering the granular material as a flowing charge to the receptacle and then feeding the same into position in the receptacle as a plurality of divided, downwardly inclined, supported streams.

Figure 2:
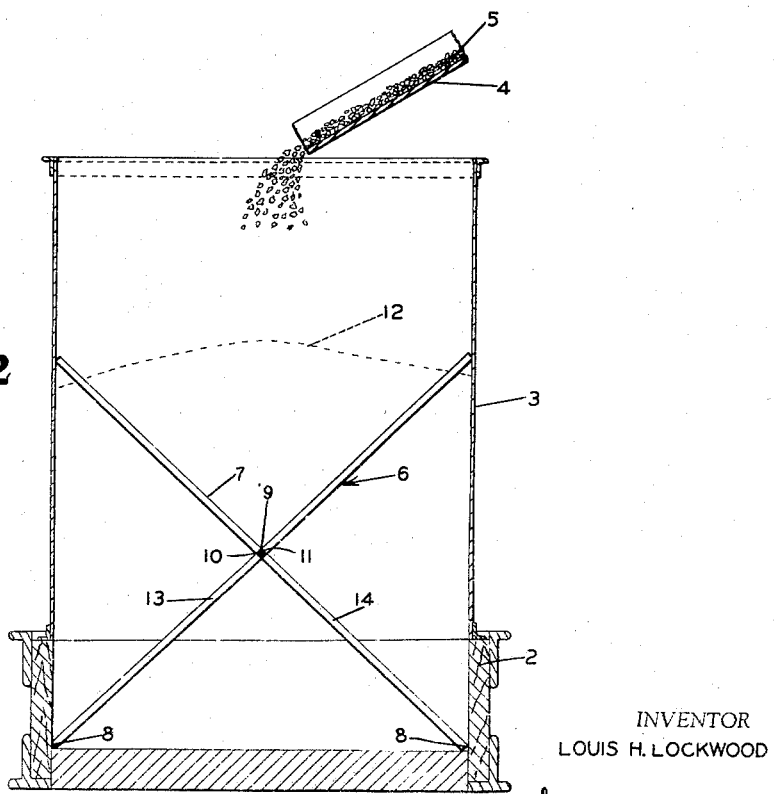

In order that the invention may be clearly understood, an embodiment will be described in conjunction with the attached drawing, in which:

Figure 1 is a diagrammatic top plan view of a mold and filling boot arrangement useful in the practice of the method of the invention, and Figure 2 is a sectional view taken along the line II—II of Figure 1.

Referring to the drawing there is shown a mold 2 which may be a dielectric heating mold, such as disclosed in Lockwood Patent 2,625,710. Mounted above the mold 2 and supported thereon is a filling boot 3 which is removable from the mold. Disposed above the filling boot 3 is a swingable chute 4 down which the binder-coated cork granules 5 flow by gravity. Disposed within the mold and extending part way into the filling boot is a removable distribution unit generally indicated by the numeral 6.

The unit 6 is preferably formed of a plurality of relatively narrow inclined delivery members or surfaces 7 which are preferably arranged with their ends 8 disposed in the corners formed where the end walls of the mold join the bottom wall. These delivery members for a mold which is 28" wide and 50" long may be made of wood about 1" thick and may be 4" wide. Their dimensions, including their length, will depend upon the depth of the charge and the size of the mold as well as the nature of the granular material being charged, and other variable factors. Preferably they are so arranged that the line of intersection 9 between adjacent inclined delivery members lies somewhat above the top edge of the mold, but this is not critical. With a mold 12" deep the members may be about 6' long. A rod 10 may be provided to hold the members together as a unit 6; the rod passes through the members 7 at the line of intersection, and spacers 11 are interposed between each of the adjacent members. The spacers may be about 1" long in the specific embodiment described. As shown in Figure 1, there are ten delivery members disposed within the 28" wide mold. With this pinned arrangement, the unit 6 may be partially or completely collapsed for insertion into the mold either before or after the filling boot is applied thereto. It is removed, of course, prior to compression of the binder-coated granules into a mass of a desired density prior to heating to cure the binder.

The cork granules which are fed into the mold are delivered as a flowing charge, as diagrammatically shown in Figure 2, and this charge upon engagement with the alternately inclined members 7 is divided into a plurality of downwardly inclined streams. These streams are supported by the upper surfaces of members 7 as they are directed into the receptacle, i. e., the mold 2 and the filling boot 3. Some of the granules fall freely into the receptacle in the area between the members 7; and, of course, as charging is effected, some of the granules fall over the longitudinal edges of the members 7, a substantial portion, however, being directed down the upper surfaces of such members into position in the receptacle. As a result of this combined action, there is a complete intermingling of the granules and objectionable particle segregation is eliminated. Additional agitation of the mass may be secured when the unit 6 is withdrawn from within the receptacle. This is preferably accomplished by partially collapsing the unit 6 and withdrawing it through the charged mass, although if desired the device may be completely collapsed prior to removal. Collapsing of the unit 6 within the receptacle will also effect some redistribution of the granules, although it will not be of major significance. In Figure 2 the dotted line 12 indicates the approximate level of the charged mass which buries substantially all of the supporting surfaces of the removable distribution unit.

While it is preferred to have the supporting surfaces 7 disposed in generally X formation as shown in Figure 2, the legs which have been indicated 13, or those indicated 14, or both, or a portion of them may be eliminated.

In any event there will be provided inclined delivery surfaces supporting the individual streams of granules as they are deposited in the receptacle. The alternate supporting surfaces preferably will intersect, but this may not be necessary with some granular materials; in which event, the individual streams may all travel downwardly in a single direction into the receptacle.

I claim:

1. In a method of charging a receptacle with granular material made up of particles of various sizes and thus subject to particle segregation to deposit the granular material in the receptacle in a condition essentially free of segregation, the steps comprising: delivering said granular material as a flowing charge between and onto a plurality of spaced, downwardly inclined supporting surfaces projecting into said receptacle, flowing said granular material downwardly by gravity along said surfaces and into position within said receptacle with some of said granules being supported by said surfaces in their travel into said receptacle until they engage other granules deposited within said receptacle, continuing this flow of granular material into the receptacle until a body thereof of substantial depth is built up therein, burying at least partially some of said supporting surfaces within said body of granules, and then withdrawing said supporting surfaces through said built up body of granules.

2. In a method of charging a receptacle with granular material made up of particles of various sizes and thus subject to particle segregation to deposit the granular material in the receptacle in a condition essentially free of segregation, the steps comprising: delivering said granular material as a flowing charge between and onto a plurality of closely spaced, narrow, downwardly inclined supporting surfaces projecting into said receptacle toward two of the walls of said receptacle, flowing said granular material downwardly by gravity along said surfaces and into position within said receptacle with some of said granules being supported by said surfaces in their travel into said receptacles until they engage other granules deposited within the receptacle, continuing this flow of granular material into the receptacle until a body thereof of substantial depth is built up therein, burying at least partially some of said supporting surfaces within said body of granules, and then withdrawing said supporting surfaces through said built up body of granules.

3. In a method of charging a receptacle with granular material made up of particles of various sizes and thus subject to particle segregation to deposit the granular material in the receptacle in a condition essentially free of segregation, the steps comprising the steps of claim 2 in which the downwardly inclined streams flow alternately in divergent directions.

4. In a method of charging a receptacle with granular material made up of particles of various sizes and thus subject to particle segregation to deposit the granular material in the receptacle in a condition essentially free of segregation, the steps comprising: delivering said granular material as a flowing charge between and onto a plurality of spaced, downwardly inclined supporting surfaces projecting into said receptacle, with a substantial portion of the flowing charge being intercepted by said supporting surfaces, flowing said granular material downwardly by gravity along said surfaces as alternately directed, divergent supported streams moving along said surfaces and into position within said receptacle with some of said granules being supported by said surfaces in their travel into said receptacle until they engage other granules deposited within the receptacle, continuing this flow of granular material into the receptacle until a body thereof of substantial depth is built up therein, burying at least partially some of said supporting surfaces within said body of granules, and then withdrawing said supporting surfaces through said built up body of granules.

References Cited in the file of this patent

UNITED STATES PATENTS

| | | |
|---|---|---|
| 873,049 | Irving | Dec. 10, 1907 |
| 1,594,310 | Long et al. | July 27, 1926 |
| 1,835,914 | Stockdale | Dec. 8, 1931 |
| 2,712,407 | Bell et al. | July 5, 1955 |

UNITED STATES PATENT OFFICE
CERTIFICATE OF CORRECTION

Patent No. 2,857,936                                                                   October 28, 1958

Louis H. Lockwood

It is hereby certified that error appears in the printed specification of the above numbered patent requiring correction and that the said Letters Patent should read as corrected below.

Column 1, line 29, after "manufacture" insert -- of --; column 2, line 18, for "object" read -- subject --.

Signed and sealed this 13th day of January 1959.

(SEAL)
Attest:
KARL H. AXLINE
Attesting Officer

ROBERT C. WATSON
Commissioner of Patents